United States Patent
Lee et al.

(10) Patent No.: US 12,003,337 B2
(45) Date of Patent: Jun. 4, 2024

(54) METHOD AND APPARATUS FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 412 days.

(21) Appl. No.: 17/508,478

(22) Filed: Oct. 22, 2021

(65) Prior Publication Data

US 2022/0131656 A1    Apr. 28, 2022

(30) Foreign Application Priority Data

Oct. 23, 2020    (KR) ........................ 10-2020-0138031

(51) Int. Cl.
*H04L 1/18* (2023.01)
*H04L 1/1812* (2023.01)
*H04L 1/1829* (2023.01)

(52) U.S. Cl.
CPC .......... *H04L 1/1861* (2013.01); *H04L 1/1812* (2013.01); *H04L 1/1854* (2013.01)

(58) Field of Classification Search
CPC ... H04L 1/1861; H04L 1/1812; H04L 1/1854; H04L 2001/0093; H04L 1/1822; H04L 1/1825; H04L 1/1896
USPC ........................................................ 370/329
See application file for complete search history.

(56) References Cited

U.S. PATENT DOCUMENTS

| | | | |
|---|---|---|---|
| 2012/0140649 A1* | 6/2012 | Choudhury ........... | H04L 5/0053 370/252 |
| 2018/0035425 A1* | 2/2018 | Yang ....................... | H04L 5/001 |
| 2019/0260516 A1* | 8/2019 | Baldemair ............ | H04L 1/1861 |

* cited by examiner

*Primary Examiner* — Tu T Nguyen
(74) *Attorney, Agent, or Firm* — BRYAN CAVE LEIGHTON PAISNER LLP

(57) ABSTRACT

According to an embodiment of the present invention a UE may receive downlink control information (DCI), perform data reception and determine HARQ-ACK based on a result of the data reception, wherein the HARQ-ACK is reported through a physical uplink control channel (PUCCH) based on either: a first reporting type in which the HARQ-ACK reporting is performed for NACK only, or a second reporting type in which the HARQ-ACK reporting is performed for ACK/NACK both, and the UE may select one of the first reporting type and the second reporting type and a resource of the PUCCH based on the DCI.

15 Claims, 11 Drawing Sheets

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application claims the benefit of KR patent Application No. 10-2020-0138031 filed on Oct. 23, 2020 which is hereby incorporated by reference as if fully set forth herein.

TECHNICAL FIELD

The present disclosure relates to a wireless communication system, and more particularly, to a method and apparatus for transmitting/receiving a wireless signal.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the present disclosure is to provide a method of efficiently performing wireless signal transmission/reception procedures and an apparatus therefor.

It will be appreciated by persons skilled in the art that the objects and advantages that could be achieved with the present disclosure are not limited to what has been particularly described hereinabove and the above and other objects and advantages that the present disclosure could achieve will be more clearly understood from the following detailed description.

In an aspect of the present invention, a method of receiving a signal by a user equipment (UE) in a wireless communication system, may comprise receiving a physical downlink control channel (PDCCH) carrying downlink control information (DCI); performing data reception based on the DCI; and determining hybrid automatic repeat request (HARQ)-acknowledgement (ACK) based on a result of the data reception. The HARQ-ACK may be reported through a physical uplink control channel (PUCCH) based on either a first reporting type in which the HARQ-ACK reporting is performed for negative-ACK (NACK) only, or a second reporting type in which the HARQ-ACK reporting is performed for ACK/NACK both. The UE may select one of the first reporting type and the second reporting type based on the DCI. The UE may select a resource of the PUCCH based on the DCI.

The DCI may include information indicating one of the first reporting type and the second reporting type and information indicating the resource of the PUCCH.

For the first reporting type, the HARQ-ACK reporting on the PUCCH can be skipped for ACK.

The UE may determine, based on the DCI, whether to enable or disable a HARQ process for the data reception.

The DCI may include information indicating whether to enable or disable the HARQ process.

Based on a field of the DCI being a specific value, the UE may determine to disable the HARQ process.

The UE may flush a reception buffer upon an expiry of a retransmission-related timer.

The UE may determine not to perform the HARQ-ACK reporting based on a number of retransmissions performed for the data being a maximum retransmission number.

The data reception may be related to at least one of a plurality of repeated transmissions. The first reporting type and the second reporting types are used for different transmissions respectively from among the plurality of repeated transmissions.

The data reception may be related to a multicast and broadcast service (MBS).

The DCI may be common for a plurality of UEs receiving the MBS.

According to other aspect of the present invention, a non-transitory computer readable medium recorded thereon program codes for performing the aforementioned method is presented.

According to another aspect of the present invention, the UE configured to perform the aforementioned method is presented.

According to another aspect of the present invention, a device configured to control the UE to perform the aforementioned method is presented.

DETAILED DESCRIPTION

Figure 1:
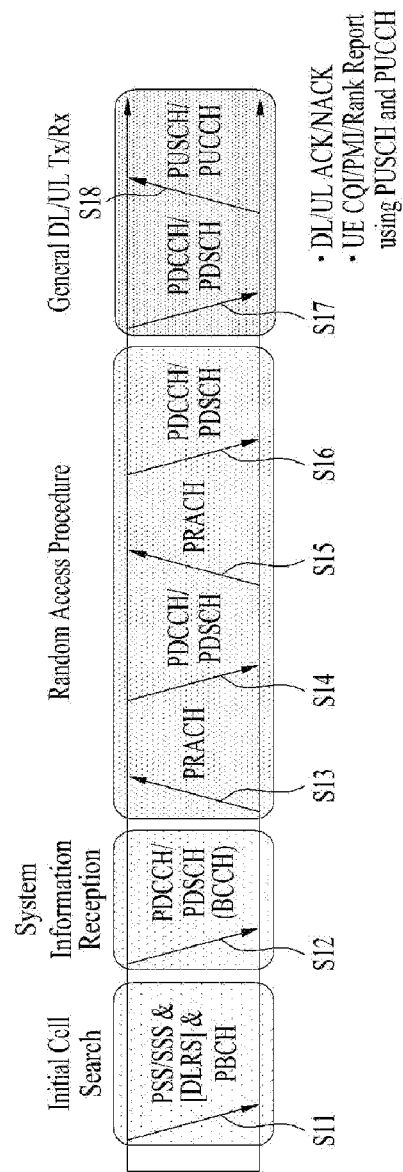
FIG. 1 illustrates physical channels used in a 3rd generation partnership project (3GPP) system, which is an example of wireless communication systems, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

Details of the background, terminology, abbreviations, etc. used herein may be found in 3GPP standard documents published before the present disclosure.

Following documents are incorporated by reference:
3GPP LTE
TS 36.211: Physical channels and modulation
TS 36.212: Multiplexing and channel coding
TS 36.213: Physic al layer procedures
TS 36.300: Overall description
TS 36.321: Medium Access Control (MAC)
TS 36.331: Radio Resource Control (RRC)
3GPP NR
TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification Abbreviations and Terms PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value
BWP: BandWidth Part
CORESET: COntrol REsourse SET
REG: Resource element group
SFI: Slot Format Indicator
COT: Channel occupancy lime
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
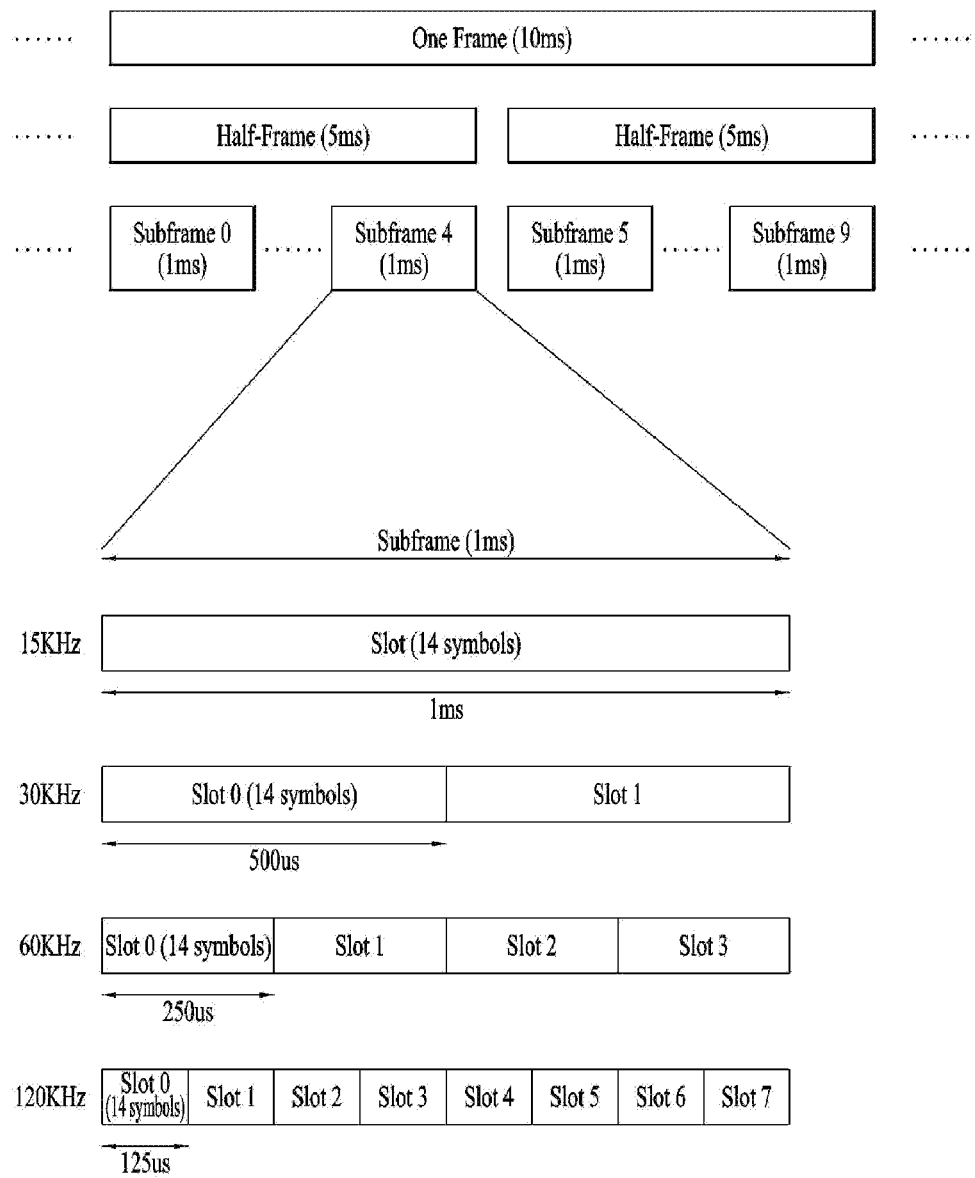
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
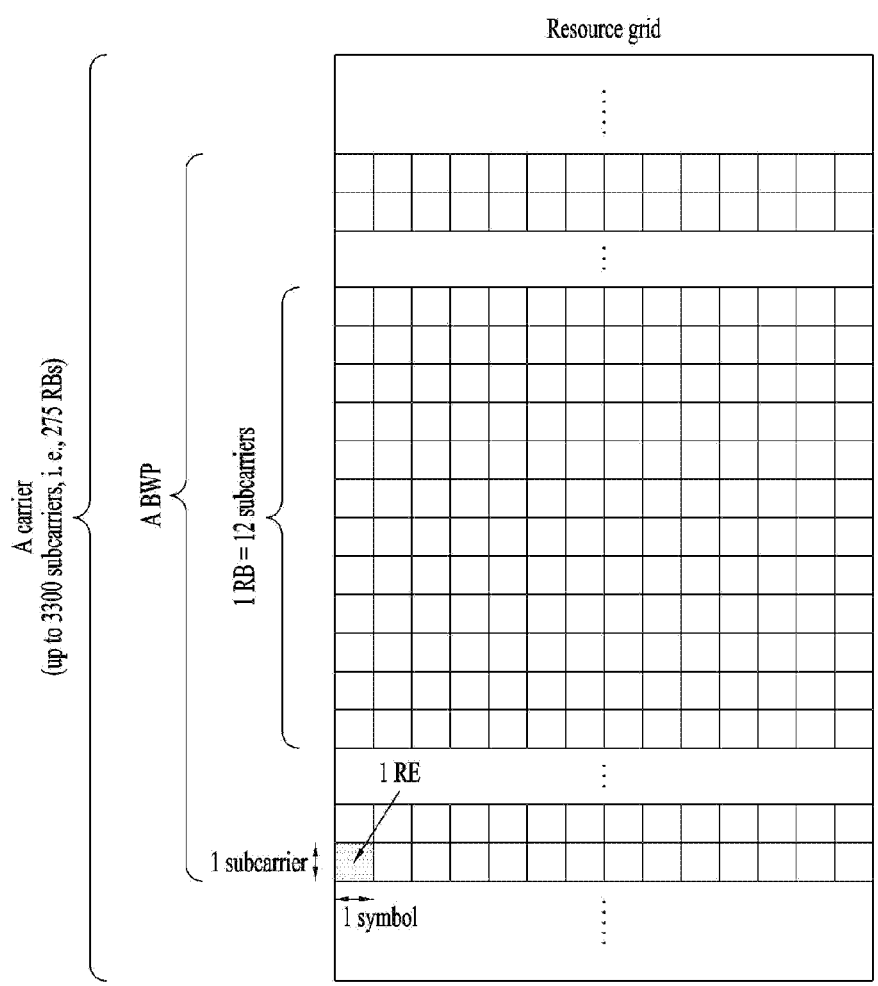
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
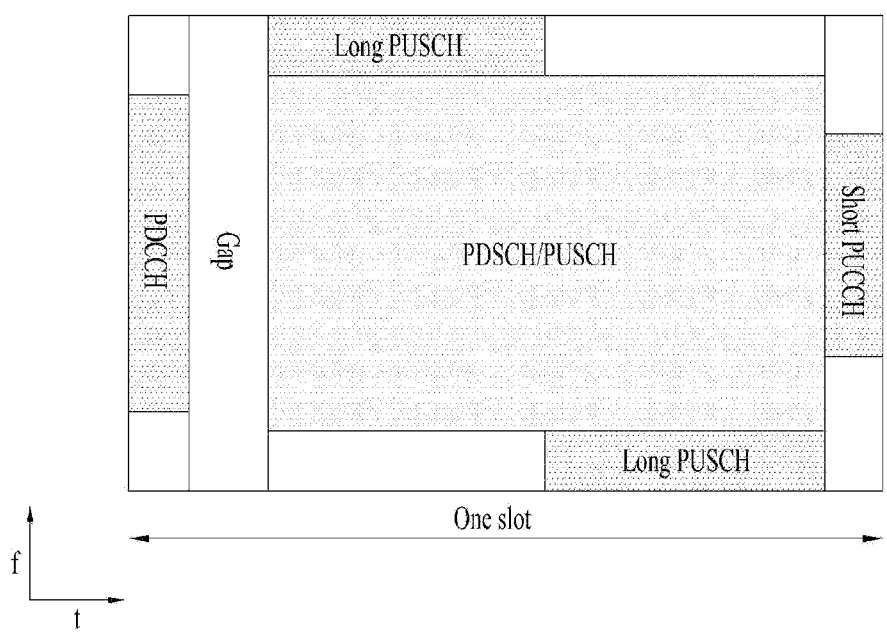
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols (hereinafter, referred to as a DL control region) of a slot may be used to transmit a DL control channel (e.g., PDCCH), and the last M symbols (hereinafter, referred to as a UL control region) of the slot may be used to transmit a UL control channel (e.g., PUCCH). Each of N and M is an integer equal to or larger than 0. A resource region (hereinafter, referred to as a data region) between the DL control region and the UL control region may be used to transmit DL data (e.g., PDSCH) or UL data (e.g., PUSCH). A guard period (GP) provides a time gap for transmission mode-to-reception mode switching or reception mode-to-transmission mode switching at a BS and a UE. Some symbol at the time of DL-to-UL switching in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
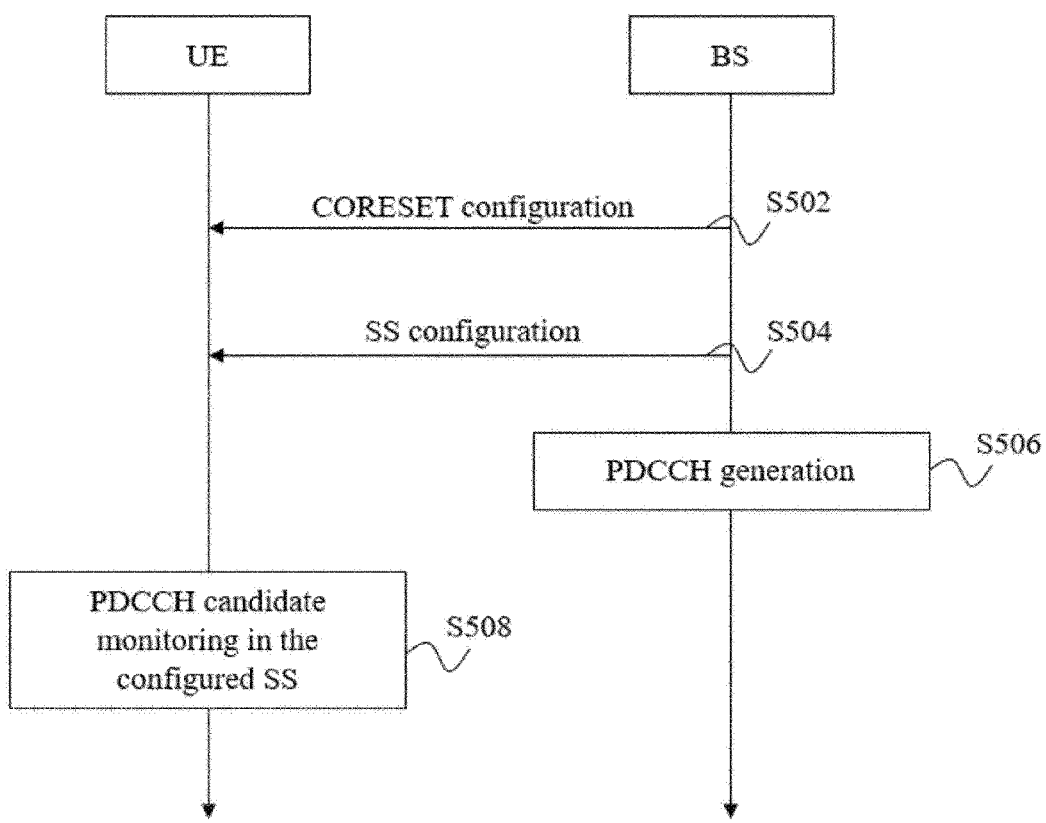
FIG. 5 is a diagram illustrating a signal flow for a physical downlink control channel (PDCCH) transmission and reception process.

FIG. 5 is a diagram illustrating a signal flow for a PDCCH transmission and reception process.

Referring to FIG. 5, a BS may transmit a control resource set (CORESET) configuration to a UE (S502). A CORSET is defined as a resource element group (REG) set having a given numerology (e.g., an SCS, a CP length, and so on). An REG is defined as one OFDM symbol by one (P)RB. A plurality of CORESETs for one UE may overlap with each other in the time/frequency domain. A CORSET may be configured by system information (e.g., a master information block (MIB)) or higher-layer signaling (e.g., radio resource control (RRC) signaling). For example, configuration information about a specific common CORSET (e.g., CORESET #0) may be transmitted in an MIB. For example, a PDSCH carrying system information block 1 (SIB1) may be scheduled by a specific PDCCH, and CORSET #0 may be used to carry the specific PDCCH. Configuration information about CORESET #N (e.g., N>0) may be transmitted by RRC signaling (e.g., cell-common RRC signaling or UE-specific RRC signaling). For example, the UE-specific RRC signaling carrying the CORSET configuration information may include various types of signaling such as an RRC setup message, an RRC reconfiguration message, and/or BWP configuration information. Specifically, a CORSET configuration may include the following information/fields.

controlResourceSetId: indicates the ID of a CORESET.
frequencyDomainResources: indicates the frequency resources of the CORESET. The frequency resources of the CORESET are indicated by a bitmap in which each bit corresponds to an RBG (e.g., six (consecutive) RBs). For example, the most significant bit (MSB) of the bitmap corresponds to a first RBG. RBGs corresponding to bits set to 1 are allocated as the frequency resources of the CORESET.
duration: indicates the time resources of the CORESET. Duration indicates the number of consecutive OFDM symbols included in the CORESET. Duration has a value of 1 to 3.
cce-REG-MappingType: indicates a control channel element (CCE)-REG mapping type. Interleaved and non-interleaved types are supported.
interleaverSize: indicates an interleaver size.
pdcch-DMRS-ScramblingID: indicates a value used for PDCCH DMRS initialization. When pdcch-DMRS-ScramblingID is not included, the physical cell ID of a serving cell is used.
precoderGranularity: indicates a precoder granularity in the frequency domain.
reg-BundleSize: indicates an REG bundle size.
tci-PresentInDCI: indicates whether a transmission configuration index (TCI) field is included in DL-related DCI.
tci-StatesPDCCH-ToAddList: indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown in FIG. 5 as separately signaled, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a USS set or a CSS set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: indicates the ID of an SS.
controlResourceSetId: indicates a CORESET associated with the SS.
monitoringSlotPeriodicityAndOffset: indicates a periodicity (in slots) and offset (in slots) for PDCCH monitoring.
monitoringSymbolsWithinSlot: indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
nrofCandidates: indicates the number of PDCCH candidates (one of values 0, 1, 2, 3, 4, 5, 6, and 8) for each AL where AL={1, 2, 4, 8, 16}.
searchSpaceType: indicates common search space (CSS) or UE-specific search space (USS) as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |

TABLE 3-continued

| Type | Search Space | RNTI | Use Case |
|---|---|---|---|
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is set to one of an interleaved type and a non-interleaved type.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two 01-DM symbols, an REG bundle includes 2 or 6 REGs, and in a CORESET including three OFDM symbols, an REG bundle includes 3 or 6 REGs. An REG bundle size is configured on a CORE-SET basis.

PDSCH carries downlink data (e.g., DL-SCH transport block, DL-SCH TB). The modulation scheme such as Quadrature Phase Shift Keying (QPSK), 16 Quadrature Amplitude Modulation (QAM), 64 QAM, or 256 QAM is applied to the PDSCH. A codeword is generated by encoding the TB. The PDSCH can carry up to two codewords. Scrambling and modulation mapping are performed for each codeword, and modulation symbols generated from each codeword may be mapped to one or more layers. Each layer is mapped to resources along with a demodulation reference signal (DMRS), is generated as an OFDM symbol signal, and is transmitted through a corresponding antenna port.

PUCCH carries Uplink Control Information (UCI). UCI may include one or more of following information:

SR (Scheduling Request): Information used to request a UL-SCH resource.

HARQ (Hybrid Automatic Repeat reQuest)-ACK (Acknowledgment): It is a response to a downlink data packet (e.g., codeword) on the PDSCH, and indicates whether the downlink data packet has been successfully received. 1 bit of HARQ-ACK may be transmitted in response to a single codeword, and 2 bits of HARQ-ACK may be transmitted in response to two codewords. The HARQ-ACK response includes positive ACK (simply, ACK), negative ACK (NACK), DTX or NACK/DTX. Here, HARQ-ACK may be called as HARQ ACK/NACK and ACK/NACK.

CSI (Channel State Information): feedback information for a downlink channel. Multiple Input Multiple Output (MIMO)-related feedback information includes a Rank Indicator (RI) and a Precoding Matrix Indicator (PMI).

Table 5 shows PUCCH formats. According to PUCCH length, PUCCH formats can be classified as Short PUCCH (format 0, 2) and Long PUCCH (format 1, 3, 4).

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 carries UCI having a maximum size of 2 bits, and is mapped and transmitted based on a sequence. Specifically, the UE transmits a specific UCI to the base station by transmitting one of the plurality of sequences through the PUCCH having the PUCCH format 0. The UE transmits a PUCCH format 0 within a PUCCH resource for configuring a corresponding SR only when transmitting a positive SR.

PUCCH format 1 carries UCI with a maximum size of 2 bits, and a modulation symbol is spread by an orthogonal cover code (OCC) (configured differently depending on whether frequency hopping is performed) in the time domain. DMRS is transmitted in a symbol in which a modulation symbol is not transmitted (i.e., time division multiplexing (TDM) is performed).

PUCCH format 2 carries UCI having a bit size greater than 2 bits, and a modulation symbol is transmitted with DMRS based on frequency division multiplexing (FDM). DM-RS is located at symbol indexes #1, #4, #7, and #10 in a given resource block with a density of ⅓. A Pseudo Noise (PN) sequence is used for the DM_RS sequence. For 2-symbol PUCCH format 2, frequency hopping may be enabled.

For PUCCH format 3, UE multiplexing is not performed in the same physical resource blocks, and the PUCCH format 3 carries UCI having a bit size greater than 2 bits. PUCCH resource of PUCCH format 3 does not include an orthogonal cover code. The modulation symbol is transmitted with the DMRS based on time division multiplexing (TDM).

For PUCCH format 4, UE multiplexing is supported for up to 4 UEs in the same physical resource blocks, and the PUCCH format 4 carries UCI having a bit size greater than 2 bits. PUCCH resource of PUCCH format 3 includes an orthogonal cover code. The modulation symbol is transmitted with DMRS based on time division multiplexing (TDM).

PUSCH carries uplink data (e.g., UL-SCH transport block, UL-SCH TB) and/or uplink control information (UCI). PUCCH is transmitted based on a CP-OFDM (Cyclic Prefix-Orthogonal Frequency Division Multiplexing) waveform or a Discrete Fourier Transform-spread-Orthogonal Frequency Division Multiplexing (DFT-s-OFDM) waveform. When the PUSCH is transmitted based on the DFT-s-OFDM waveform, the UE performs transform precoding for the PUSCH. For example, if transform precoding is not performed (e.g., transform precoding is disabled), the UE transmits a PUSCH based on the CP-OFDM waveform. If transform precoding is performed (e.g., transform precoding is enabled), the UE transmits the PUSCH based on a CP-OFDM waveform or a DFT-s-OFDM waveform. PUSCH transmission is dynamically scheduled by a UL grant in DCI (e.g., Layer 1 (PDCCH) signaling), and/or semi-statically scheduled based on higher layer (e.g., RRC) signaling (configured grant). PUSCH transmission may be performed on a codebook-based or non-codebook-based basis.

Figure 6:
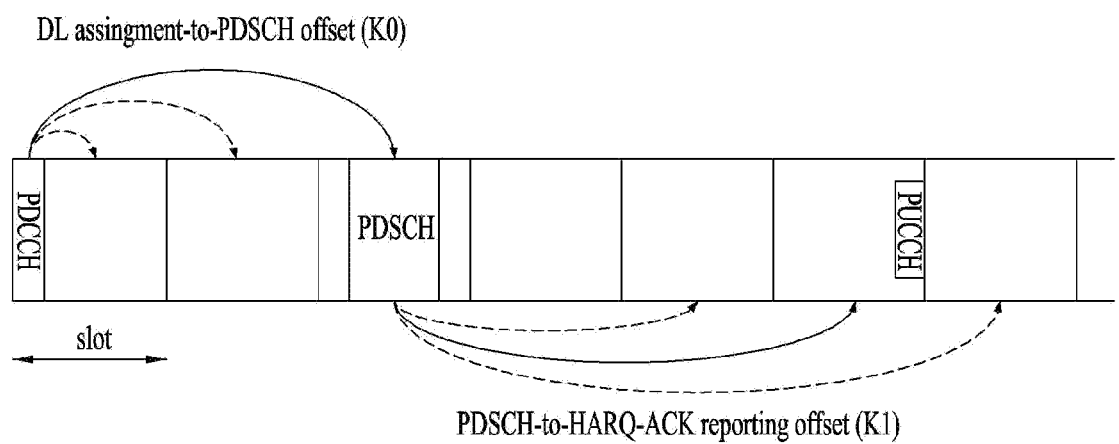
FIG. 6 illustrates an ACK/NACK transmission example.

FIG. 6 illustrates an ACK/NACK transmission example. Referring to FIG. 6, the UE may detect the PDCCH in slot #n. Here, the PDCCH includes downlink scheduling information (e.g., DCI formats 1_0, 1_1), and the PDCCH indicates a DL assignment-to-PDSCH offset (K0) and a PDSCH-HARQ-ACK reporting offset (K1). For example, DCI formats 1_0 and 1_1 may include the following information:

Frequency domain resource assignment (FDRA): FDRA indicates the RB set allocated to the PDSCH.

Time domain resource assignment (TDRA): TDRA indicates K0 (e.g., slot offset), the starting position (e.g., OFDM symbol index) of the PDSCH within slot #n+K0, and the length of the PDSCH (e.g., the number of OFDM symbols).

PDSCH-to-HARQ_feedback timing indicator, which indicates K1 (e.g., slot offset)

HARQ process number (4 bits), which indicates the HARQ process ID (Identity) for data (e.g., PDSCH, TB)

PUCCH resource indicator (PRI): PRI indicates a PUCCH resource to be used for UCI transmission among a plurality of PUCCH resources in the PUCCH resource set UE start to receive the PDSCH in slot #(n+K0) based on the scheduling information received in slot #n. After completion of the PDSCH reception in slot #n1 (where, n+K0≤n1), the UE may transmit UCI through PUCCH from slot #(n1+K1). Here, the UCI may include a HARQ-ACK response for the PDSCH. In FIG. 6, for convenience, it is assumed that the SCS for the PDSCH and the SCS for the PUCCH are the same, and it is assumed that slot #n1=slot #n+K0, but the present invention is not limited thereto. If the SCSs are different, K1 may be indicated/interpreted based on the SCS of the PUCCH.

If the PDSCH is configured to carry a maximum of 1 TB, the HARQ-ACK response may have 1-bit. When the PDSCH is configured to carry a maximum of 2 TBs, the HARQ-ACK response may be configured with 2-bits when spatial bundling is not configured, and may be configured with 1-bits when spatial bundling is configured. When the HARQ-ACK transmission time for the plurality of PDSCHs is configured as slot #(n+K1), the UCI transmitted in the slot #(n+K1) includes HARQ-ACK responses for the plurality of PDSCHs.

Whether the UE should perform spatial bundling for the HARQ-ACK response may be configured for each cell group (e.g., RRC/higher layer signaling). As an example, spatial bundling may be individually configured in each of the HARQ-ACK response transmitted through the PUCCH and/or the HARQ-ACK response transmitted through the PUSCH.

Spatial bundling may be supported when the maximum number of TBs (or codewords) that can be received at one time in the corresponding serving cell (or schedulable through 1 DCI) is two (or two or more) (e.g., higher layer parameter maxNrofCodeWordsScheduledByDCI is equal to 2-TB). Meanwhile, a number of layers greater than four may be used for 2-TB transmission, and a maximum of four layers may be used for 1-TB transmission. As a result, when spatial bundling is configured in a corresponding cell group, spatial bundling may be performed on a serving cell that can schedule more than four layers among serving cells in the corresponding cell group. On a corresponding serving cell, a UE desiring to transmit a HARQ-ACK response through spatial bundling may generate a HARQ-ACK response by performing (bit-wise) logical AND operation on A/N bits for a plurality of TBs.

For example, assuming that the UE receives DCI for scheduling 2-TB and receives 2-TB through the PDSCH based on the DCI. If spatial bundling is performed, a single A/N bit may be generated by performing a logical AND operation on the first A/N bit for the first TB and the second A/N bit for the second TB. As a result, if both the first TB and the second TB are ACKs, the UE reports the ACK bit value to the base station, and when either TB is NACK, the UE reports the NACK bit value to the base station.

A plurality of parallel DL HARQ processes can be configured for DL transmission in the base station/terminal. A plurality of parallel HARQ processes allow DL transmissions to be performed continuously while waiting for HARQ feedback on successful or unsuccessful reception of the previous DL transmission. Each HARQ process is associated with a HARQ buffer of a MAC (Medium Access Control) layer. Each DL HARQ process manages information related to the number of MAC PDU (Physical Data Block) transmissions in the buffer, HARQ feedback for the MAC PDU in the buffer, and a current redundancy version. Each HARQ process is identified by a HARQ process ID.

Figure 7:
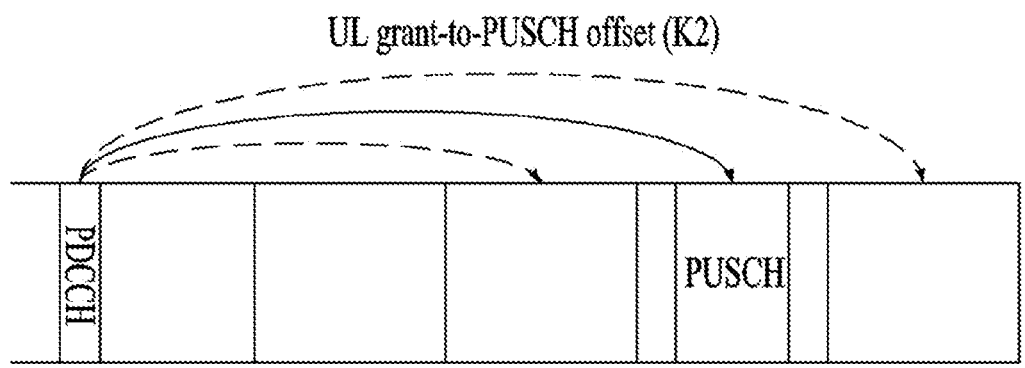
FIG. 7 illustrates a PUSCH transmission example

FIG. 7 illustrates a PUSCH transmission example. Referring to FIG. 7, the UE may detect the PDCCH in slot #n. Here, the PDCCH includes uplink scheduling information (e.g., DCI formats 0_0, 0_1). DCI formats 0_0 and 0_1 may include the following information:

Frequency domain resource assignment (FDRA), which indicates the RB set allocated to the PUSCH Time domain resource assignment (TDRA), which indicates the slot offset K2, the start position (e.g., symbol index) and length (e.g., number of OFDM symbols) of the PUSCH in the slot. The start symbol and length may be indicated through a Start and Length Indicator Value (SLIV), or may be indicated respectively.

UE may transmit the PUSCH in slot #(n+K2) according to the scheduling information received in slot #n. The PUSCH may include a UL-SCH TB.

Beam Management (BM) Procedure

A DL BM procedure is described. DL BM procedure may include (1) transmission of beamformed DL RSs (e.g., CSI-RS or SS Block (SSB)) of the base station, and (2) beam reporting of the UE. Here, the beam reporting may include a preferred DL RS ID(s) and a corresponding reference signal received power (L1-RSRP). The DL RS ID may be an SSB Resource Indicator (SSBRI) or a CSI-RS Resource Indicator (CRI).

The SSB beam and the CSI-RS beam may be used for beam measurement. Here, measurement metric may be L1-RSRP per resource/block. SSB may be used for coarse beam measurement, and CSI-RS may be used for fine beam measurement. And, SSB can be used for both Tx beam sweeping and Rx beam sweeping. Rx beam sweeping using SSB may be performed at a UE by changing the Rx beam for the same SSBRI across multiple SSB bursts. Here, one SS burst includes one or more SSBs, and one SS burst set includes one or more SSB bursts.

The UE may receive RRC configuration regarding a list of maximum M candidate Transmission Configuration Indication (TCI) states for the purpose of at least Quasi Co-location (QCL) indication. Here, M may be 64. Each TCI state may be set to one RS set.

Each ID of DL RS for spatial QCL purpose (e.g., QCL Type D) in the RS set may be related to one of DL RS types such as SSB, P-CSI RS, SP-CSI RS, and A-CSI RS. At least, initialization/update of ID of DL RS(s) in RS set used for spatial QCL purpose can be performed through at least explicit signaling.

Table 6 shows an example of a TCI-State information element (IE). The TCI-State IE associates one or two DL RSs to a corresponding QCL type.

TABLE 6

```
-- ASN1START
-- TAG-TCI-STATE-START
TCI-State ::=           SEQUENCE {
    tci-StateId         TCI-StateId,
    qcl-Type1           QCL-Info,
    qcl-Type2           QCL-Info          OPTIONAL,   -- Need R
    ...
}
QCL-Info ::=            SEQUENCE {
    cell                ServCellIndex     OPTIONAL,   -- Need R
    bwp-Id              BWP-Id            OPTIONAL, -- Cond CSI-RS-Indicated
    referenceSignal     CHOICE {
        csi-rs              NZP-CSI-RS-ResourceId,
        ssb                 SSB-Index
    },
    qcl-Type            ENUMERATED {typeA, typeB, typeC, typeD},
    ...
}
-- TAG-TCI-STATE-STOP
-- ASN1STOP
```

In Table 6, the bwp-Id parameter indicates the DL BWP in which the RS is located, the cell parameter indicates the carrier in which the RS is located, and the referencesignal parameter indicates reference antenna port(s) which is a quasi co-location source for target antenna port (s) or a reference signal including the reference antenna port(s). The target antenna port(s) may be an antenna port (s) of a CSI-RS, PDCCH DMRS, or PDSCH DMRS. For example, in order to indicate QCL reference RS information for NZP CSI-RS, a corresponding TCI state ID may be indicated through NZP CSI-RS resource configuration information. The TCI state ID may be indicated through each CORESET configuration, thereby QCL reference information for the PDCCH DMRS antenna port(s) is indicated. The TCI state ID may be indicated through DCI, thereby QCL reference information for the PDSCH DMRS antenna port(s) is indicated.

Antenna port-QCL is defined so that a property of channel carrying a symbol on the antenna port is can be inferred/estimated from a property of a channel carrying another symbol on the same antenna port.

QCL related channel property includes one or more of Delay spread, Doppler spread, Frequency shift, Average received power, Received Timing, and Spatial RX parameter. The Spatial Rx parameter means a spatial (reception) channel characteristic parameter such as angle of arrival.

The UE may be configured with a list of maximum M TCI-States through the higher layer parameter PDSCH-Config for PDSCH decoding according to a detected PDCCH having DCI intended for the UE and a given serving cell. The M depends on UE capability.

Each TCI-State includes parameters for configuring a quasi co-location relationship between one or two DL reference signals and a DM-RS port(s) of a PDSCH. The quasi co-location relationship is configured based on a higher layer parameter 'qcl-Type1' for the first DL RS and a higher layer parameter 'qcl-Type2' (if presented) for the second DL RS. In the case of a corresponding configuration including QCL information for two DL RSs, the QCL type is not the same regardless of whether the two DL RSs are QCLed with the same DL RS or different DL RSs. The quasi co-location type corresponding to each DL RS is given by the higher layer parameter 'qcl-Type of QCL-Info', and can be one of following types:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

For example, if a target antenna port(s) relates to a specific NZP CSI-RS, the corresponding NZP CSI-RS antenna ports are indicated/configured to be QCLed with a specific tracking reference signal (TRS) from a QCL-Type A perspective, and with a specific SSB from a QCL-Type D perspective. The UE receiving the indication/configuration can receive the corresponding NZP CSI-RS using the Doppler and delay values measured in QCL-TypeA TRS, and can apply a reception beam used for QCL-TypeD SSB reception to the corresponding NZP CSI-RS reception. The UE receives an activation command which is used for mapping a maximum 8 TCI states to values (field states) of 'Transmission Configuration Indication field' in DCI.

In the UL BM, beam reciprocity (or beam correspondence) between Tx beams and Rx beams may or may not be established according to UE implementation. If the reciprocity between the Tx beam and the Rx beam is established in both the base station and the UE, the UL beam pair may be aligned through the DL beam pair. However, when the reciprocity between the Tx beam and the Rx beam is not established in either of the base station and the UE, a UL beam pair determination process is required separately from the DL beam pair determination. Also, even when both the base station and the UE maintain beam correspondence, the base station may use the UL BM procedure for determining the DL Tx beam without the UE requesting a report of the preferred beam. UL BM may be performed through beamformed UL SRS transmission, and the 'SRS-SetUse' parameter can be set to 'BeamManagement'. Similarly, the UL BM procedure may be divided into Tx beam sweeping of the UE and Rx beam sweeping of the base station. The UE may receive one or more Sounding Reference Symbol (SRS) resource sets configured by (higher layer parameter) SRS-ResourceSet (through higher layer signaling, RRC signaling, etc.). For each SRS resource set, the UE K SRS resources (higher later parameter SRS-resource) may be configured. Here, K is a natural number that is equal to or greater than 1, and the maximum value of K is indicated by SRS_capability. Whether to apply the UL BM of the SRS resource set (higher layer parameter) is configured by SRS-SetUse. When the SRS-SetUse is set to 'BeamManagement (BM)', only one SRS resource can be transmitted to each of a plurality of SRS resource sets at a given time instant.

Cooperative Transmission from Multiple TRPs/Panels/Beams

A coordinated multi-point transmission (CoMP) was introduced in the LTE system and partly introduced in NR Rel-15. The CoMP can be related to (i) a method of transmitting the same signal or the same information from multiple transmission and reception points (TRPs) (e.g., same layer joint transmission), (ii) a method of transmitting by a specific TRP at a specific moment in consideration of radio channel quality or traffic load conditions while sharing information to be transmitted to UE between a plurality of TRPs (e.g., point selection), or (iii) a method of transmitting different signals or information from a plurality of TRPs to different spatial layers by spatial dimension multiplexing (SDM) (e.g., independent layer joint transmission), or other various ways. As one example of the point selection methods, there is a dynamic point selection (DPS) method in which an actual transmitting TRP can be changed at each PDSCH transmission instance, and the QCL information informs the UE of which TRP is transmitting the PDSCH at present. In this regards, the QCL information can be used for indicating the UE can assume the same channel properties (e.g., Doppler shift, Doppler spread, average delay, delay spread, spatial RX parameter) between different antenna ports. For example, when the PDSCH is to be transmitted in TRP #1, it is informed that the corresponding PDSCH DMRS antenna ports and a specific RS (e.g., CSI-RS resource #1) that has been used in TRP #1 are QCLed. And when the PDSCH is to be transmitted in TRP #2, it is informed that the corresponding PDSCH DMRS antenna ports and a specific RS (e.g., CSI-RS resource #2) that has been used in TRP #1 are QCLed. For instantaneous QCL information indication, a PDSCH quasi-colocation information (PQI) field was defined in DCI of LTE, and similarly a transmission configuration information (TCI) field is defined in NR. The QCL indication/configuration method defined in the standard can be used not only for cooperative transmission between a plurality of TRPs, but also used for cooperative transmission between a plurality of panels (e.g., antenna groups) of the same TRP, or for cooperative transmission between a plurality of beams of the same TRP, etc. This is because if transmission panels or beams used in the same TRP are different, the Doppler, delay property, or reception beam (spatial Rx parameter) of each panel/beam may be different.

A method of Multiple TRPs/Panels/Beams are configured to transmit different layer groups to the UE may be used and the method can be called independent layer joint transmission (ILJT) or non-coherent joint transmission (NCJT).

Multimedia Broadcast/Multicast Service (MBMS)

MBMS scheme deployed in 3GPP LTE is described. 3GPP MBMS can classified as (i) a single frequency network (SFN) scheme in which cells of a plurality of base stations are synchronized for transmitting the same date through a PMCH channel, and (ii) a Single Cell Point To Multipoint (SC-PTM) scheme in which broadcasting is performed through PDCCH/PDSCH channel in a corresponding cell coverage. Normally, the SFN scheme is used for providing the broadcast service over wide area (e.g. MBMS area) through pre-allocated semi-static resource(s), whereas the SC-PTM scheme is used for providing the broadcast service within a cell coverage through a dynamic resource(s).

Terms of 3GPP LTE MBMS are defined as follows:

MBSFN Synchronization Area: an area of the network where all eNodeBs can be synchronized and perform MBSFN transmissions. MBSFN Synchronization Areas are capable of supporting one or more MBSFN Areas. On a given frequency layer, a eNodeB can only belong to one MBSFN Synchronization Area. MBSFN Synchronization Areas are independent from the definition of MBMS Service Areas MBSFN Transmission or a transmission in MBSFN mode: a simulcast transmission technique realised by transmission of identical waveforms at the same time from multiple cells. An MBSFN Transmission from multiple cells within the MBSFN Area is seen as a single transmission by a UE.

MBSFN Area: an MBSFN Area consists of a group of cells within an MBSFN Synchronization Area of a network, which are co-ordinated to achieve an MBSFN Transmission. Except for the MBSFN Area Reserved Cells, all cells within an MBSFN Area contribute to the MBSFN Transmission and advertise its availability. The UE may only need to consider a subset of the MBSFN areas that are configured, i.e. when it knows which MBSFN area applies for the service(s) it is interested to receive.

SC-PTM provides one logical channel named as SC-MCCH (Single Cell Multicast Control Channel), and one or more logical channels named as SC-MTCH (Single Cell Multicast Traffic Channel). The logical channels are mapped to a transport channel 'DL-SCH', and a physical channel 'PDSCH'. PDSCH carrying SC-MCCH or SC-MTCH data is scheduled by PDCCH scrambled with G-RNTI. Here, TMGI that corresponds to a service ID can be mapped to a specific G-RNTI value (e.g., one-to-one mapping). Thus, if base station provides a plurality of services a plurality of G-RNTI values can be allocated for SC-PTM transmission. One or more UEs may monitor PDCCH by using a specific G-RNTI for receiving a specific service. For specific service/specific G-RNTI, an SC-PTM dedicated DRX on-duration can be configured. In this case, the UEs may wake-up for a specific on-duration (s) and perform PDCCH monitoring based on G-RNTI.

HARQ-Related Operation for MBS

At least part of above paragraphs (e.g., 3GPP system, frame structure, NR system, etc.) can be referred to/coupled to/combined with one or more embodiments of the invention will be explained below. In the specification, '/' may interpreted as 'and', 'or', or 'and/or' based on its context.

For supporting MBMS service in NR system, DL broadcast or DL multicast transmission methods are discussed under Rel.-17 NR standard. Comparing with DL unicast transmission to individual UE (i.e., point-to-point), the point-to-multipoint (PTM) transmission scheme such as MBMS is advantageous for radio resource saving since multiple UEs can receive one-time DL broadcast/multicast transmission of network.

In NR, a method in which the UE reports MBMS feedback (e.g., HARQ feedback for retransmission) to the base station for reliable DL broadcast/multicast transmission is considered. The base station may transmit different optimal beams to different UEs. In this case, as the beam quality of the UE is changed, there is a problem that the optimal beam is changed before the TB is successfully received.

According to an embodiment of the present invention, a UE receiving a plurality of MBS PDSCHs on multiple RS beam resources, can be configured to receive HARQ retransmission by switching different DCIs scheduling the same MBS TB for different RS beam resources, and to support PUCCH-based HARQ A/N transmission for different DCIs. Thereby the problem of optimal beam change during TB reception can be solved.

Transmitter (e.g., Base Station)

For broadcasting the MBMS service in a cell, the base station may transmit SIB1, MBMS SIB, one or more MCCHs, and one or more MTCHs. The MCCH and the MTCH are logical channels and are transmitted through the physical channel (s), PDSCH(s), and are scheduled through the PDCCH (s). The MCCH transmits MBMS control information, and one MTCH transmits specific MBMS service data.

The base station provides BWP for MBMS (i.e., MBMS BWP) to UEs. MBMS BWP can be divided into MBMS SIB DL BWP and MBMS SIB UL BWP for MBMS SIB transmission and reception, MCCH DL BWP and MCCH UL BWP for MCCH transmission and reception, and MTCH DL BWP and MTCH UL BWP for MTCH transmission and reception. One cell may provide zero, one or more MBMS DL BWPs and zero, one or more MBMS UL BWPs. Accordingly, the base station supporting MBMS may provide all of the above MBMS BWP types separately from the existing Initial BWP or UE-dedicated BWP, or may provide only zero or some MBMS BWPs. Some or all MBMS BWPs may be the same as or different from the conventional Initial BWP or Default BWP or first active BWP or active BWP.

UE may configure SC-RNTI and MCCH transmission according to MBMS SIB or MBMS control information provided by the base station. MBMS SIB or MBMS control information may include configuration information for DL BWP and/or UL BWP for MBMS.

The MBMS SIB or MBMS control information may include at least some of the following information.

PUCCH resource sets for MBMS feedback: Common PUCCH resource mapped to specific service ID (e.g., TMGI) or specific G-RNTI or specific MBMS DL BWP or specific MTCH(s) or specific MCCH(s). Or, UE-dedicated PUCCH resources used by individual UEs receiving a specific service or specific G-RNTI based transmission.

RACH resource for MBMS feedback: RACH resource information mapped to a specific service ID (e.g., TMGI) or specific G-RNTI or specific MBMS DL BWP or specific MTCH(s) or specific MCCH(s). For example, a specific RACH preamble, Preamble Occasion, or RACH occasion may be mapped to a specific service ID (TMGI), a specific G-RNTI, a specific MBMS DL BWP, or a specific MTCH(s) or a specific MCCH(s).

The base station provides MBMS through UL BWP and/or DL BWP. For example, MCCH control information and MTCH are provided through DL BWP. Meanwhile, through the UL BWP, MBMS feedback for PDSCH for MCCH or MBMS feedback for PDSCH for MTCH is provided. The UL BWP may be used for reporting HARQ ACK/NACK of MBMS feedback or MBMS-related SSB/CSI-RS measurement result.

The base station may configure UE common PUCCH resource sets for a specific UL BWP of a specific cell for MBMS feedback. The UE common PUCCH resource set is used by UEs performing HARQ feedback for a specific MBS PDSCH, and the base station may configure the UE common PUCCH resource set as shown in Table 7 below.

TABLE 7

```
PUCCH-ResourceSet ::= SEQUENCE {
  pucch-ResourceSetId PUCCH-ResourceSetId,
  resourceList SEQUENCE (SIZE (1..maxNrofPUCCH-ResourcesPerSet))
OF PUCCH-ResourceId,
  maxPayloadSize INTEGER (4..256) OPTIONAL -- Need R
}
PUCCH-Resource ::= SEQUENCE {
  pucch-ResourceId    PUCCH-ResourceId,
  startingPRB PRB-Id,
  intraSlotFrequencyHopping ENUMERATED { enabled } OPTIONAL,
  -- Need R
  secondHopPRB PRB-Id OPTIONAL, -- Need R
  format CHOICE {
    format0 PUCCH-format0,
    format1 PUCCH-format1,
    format2 PUCCH-format2,
    format3 PUCCH-format3,
    format4 PUCCH-format4}
}
```

Figure 8:
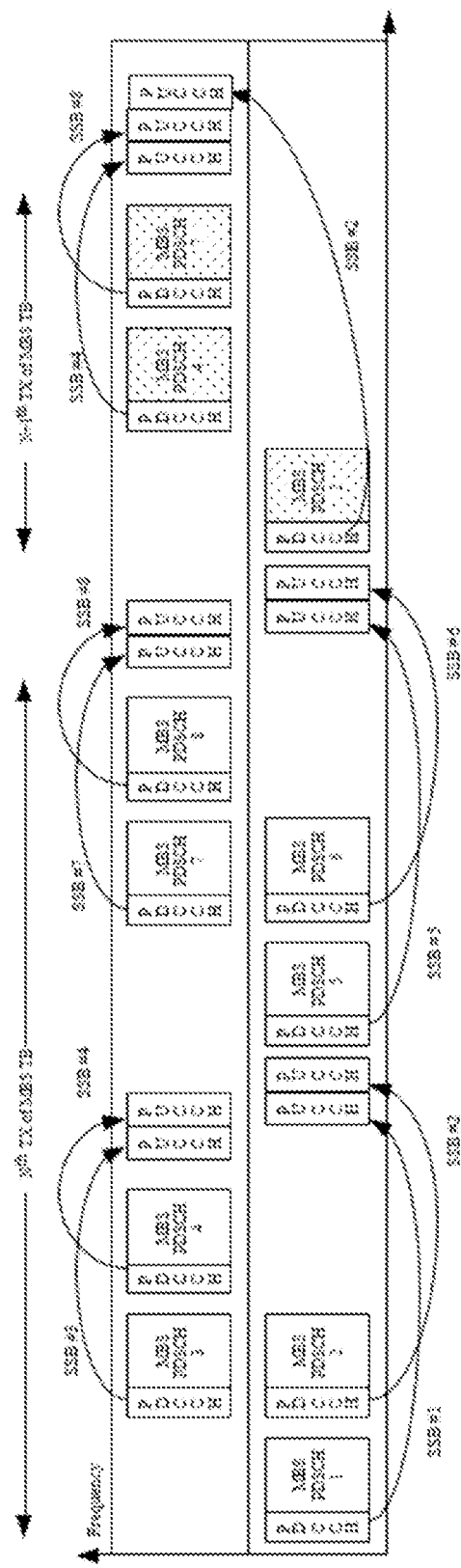
FIG. 8 illustrates PDSCH retransmission according to an embodiment of the present invention.

One or more MTCH data or one or more MCCH data may be included in one MBS Transport Block (TB) for DL transmission. The base station transmits one MBS TB through PDSCH for MBS. In FIG. 8, one MBS PDSCH transmission is scheduled through DCI of the PDCCH. CRC of DCI may be scrambled with G-RNTI. A plurality of UEs may receive the DCI, decode the PDSCH indicated by the DCI, and receive one MBS TB.

If a plurality of UEs need to receive through different beams, the base station may transmit different MBS PDSCHs on different beam RSs of one cell. In this case, different MBS PDSCHs may be used to repeatedly transmit the same MBS TB. For example, in FIG. 8, all MBS PDSCHs repeatedly transmit the same MBS TB, and different MBS PDSCH transmissions may be associated with different RSs and different TCI states. For example, one or more SSB indexes of the cell are mapped to one MBS PDSCH transmission. For example, SSB index 1 may be mapped to MBS PDCCH/PDSCH1, SSB index 2 may be mapped to MBS PDCCH/PDSCH2, SSB index 3 may be mapped to MBS PDCCH/PDSCH3, and the like. Alternatively, one or more CSI-RS resources of the cell may be mapped to one MBS PDSCH transmission.

FIG. 8 illustrates PDSCH retransmission according to an embodiment of the present invention. The PDSCH retransmission may be MBS PDSCH retransmissions performed based on UE common PUCCH.

The base station provides one or more CORESET and Search Space Set (SSS) through one or more DL BWPs for MBS PDCCH monitoring. One or more TCI states, one or more SSB indexes, one or more CSI-RS resources may be mapped to one or more CORESETs and/or SSSs.

The base station transmits a specific G-RNTI based DCI through the MBS PDCCH. In this case, the DCI may include at least some of the following information:
  Identifier for DCI formats
  Frequency domain resource assignment
  SS/PBCH index or CSI-RS resource indicator or TCI state Id
  Time domain resource assignment
  VRB-to-PRB mapping
  Modulation and coding scheme
  New data indicator
  Redundancy version
  HARQ process number
  HARQ feedback enabling indicator—1 bit
    TPC command for scheduled PUCCH—2 bits
    PUCCH resource indicator—3 bits
    PDSCH-to-HARQ feedback timing indicator—3 bits
    A/N or NACK only For HARQ transmission of MBS TB, the base station sets the same NDI value and HARQ process number for different PDSCH related to new TX transmissions of the same MBS TB. For example, in FIG. 8, all PDSCHs from PDSCH1 to PDSCH8 transmitting the same MBS TB may be configured with the same NDI value and HARQ process number. In this case, some of the PDCCH DCIs for the PDSCHs may have CRC scrambled with a specific UE-specific RNTI. Even for the UE specific RNTI based DCI, the same NDI value and HARQ process number is configured the same as that of G-RNTI based DCI. For example, even when PDSCH1 to PDSCH7 are scheduled by G-RNTI based DCI and only PDSCH8 is scheduled by C-RNTI based DCI, if the same MBS TB is transmitted through PDSCHs 1 to 8, all the DCIs including G-RNTI based DCI and C-RNTI based DCI are configured to have the same NDI value and HARQ process number. In this case, the C-RNTI based DCI may further includes an indicator indicating that the PDSCH scheduled by the C-RNTI based DCI transmits the MBS TB. Therefore, the UE will not combine the MBS TB scheduled by C-RNTI based DCI, with unicast DL HARQ transmission.

Meanwhile, the configured HARQ process number value is not used for HARQ transmission for another MBS TB until the HARQ transmission for the MBS TB is terminated.

For different PDSCHs for retransmission of the same MBS TB, DCI can be configured as follows:
  Set the same NDI value as the NDI value set by the DCI of the new TX.
  Set the same HARQ process number as the HARQ process number set by the DCI of the new TX.
  RV (Redundancy version) may be set to a value different from that of new TX. However, the DCI needs to set the same RV value for different PSDCHs that associated with the same n-th retransmissions.
  A/N or NACK only value may be set differently for n-th transmission and n+1-th transmission.
  The base station may set different HARQ feedback enabling indicator values in DCI for transmission and retransmission of the same MBS TB or n-th retransmission and n+1-th retransmission.
  Receiver (e.g., UE):
  RRC connected UE may select a CORESET and a search space set according to its current TCI state, and may receive the DCI by monitoring the PDCCH through the selected SSS. Idle or inactive UE periodically measures the SSB index or CSI-RS resource, selects the CORESET and Search Space Set mapped to the SSB index or CSI-RS resource exceeding a threshold, and monitors the PDCCH through the selected SSS to receive DCI.

The UE monitors the MBS PDCCH through the DL BWP for the MBS. If there are CORESET and SSS mapped to a current TCI state or SSB index/CSI-RS resource exceeding the threshold in a plurality of DL BWPs, the idle/inactive UE selects an initial BWP or a DL BWP that overlaps with the initial BWP, and the connected UE selects a currently active BWP or configured BWP or a DL BWP that overlaps with the currently active BWP or configured BWP.

The UE monitors the MBS PDCCH through the selected DL BWP. If there are a plurality of CORESETs and SSSs mapped to the current TCI state or the SSB index/CSI-RS resource exceeding the threshold, UE may select a CORESET and SSS not overlapped with other transmission/reception operations of the UE, or select the closest CORESET and SSS.

The UE monitors the PDCCH through the selected CORESET and SSS, and receives DCI through the PDCCH. The DCI in which the CRC is scrambled is decoded with the G-RNTI of the MBS service that the UE wants to receive.

The DCI scrambled by the G-RNTI may include at least some of the following information:

Identifier for DCI formats
Frequency domain resource assignment
SS/PBCH index or CSI-RS resource indicator or TCI state Id
Time domain resource assignment
VRB-to-PRB mapping
Modulation and coding scheme
New data indicator
Redundancy version
HARQ process number The UE receives the PDSCH indicated by the DCI. Here, 'SS/PBCH index or CSI-RS resource indicator or TCI state Id' indicates an SS/PBCH index or CSI-RS resource indicator or TCI state Id associated with the indicated PDSCH. The UE receives the PDSCH according to the indicated SS/PBCH index or CSI-RS resource indicator or TCI state Id.

The PDSCH for the same MBS TB may be retransmitted according to PUCCH transmission of the UE or another UE or the base station's determination. In this case, the UE decodes the MBS TB by combining the n-th PDSCH transmission and the n+1th PDSCH transmission of the same MBS TB.

DCI may include at least the following information to allocate PUCCH resources for HARQ feedback.

HARQ feedback enabling indicator—1 bit
  TPC command for scheduled PUCCH—2 bits
  PUCCH resource indicator—3 bits
  PDSCH-to-HARQ_feedback timing indicator—3 bits
  A/N or NACK only Alternatively, HARQ feedback enabling indicator=0 or 1 may be indicated by using other information of DCI instead of HARQ feedback enabling indicator. For example, when the PDSCH-to-HARQ_feedback timing indicator of the DCI=0 (K1=0) or when the PDSCH-to-HARQ_feedback timing indicator, K1 is set to a specific value, or when the PUCCH resource indicator is set to a specific value, or when a specific field of DCI is set to a specific value, the UE assumes that HARQ feedback enabling indicator=0. On the other hand, when the PDSCH-to-HARQ_feedback timing indicator of the DCI>0 (K1>0) or if the PDSCH-to-HARQ_feedback timing indicator, K1 is set to a specific value or not, or the PUCCH resource indicator is set to a specific value or not, or if a specific field of DCI is set to a specific value or not, the UE assumes that HARQ feedback enabling indicator=1.

If the HARQ feedback enabling indicator=0 in the n-th transmitted DCI, the UE assumes that the DCI does not include the TPC command for scheduled PUCCH, PUCCH resource indicator, and PDSCH-to-HARQ_feedback timing indicator, and does not transmit HARQ feedback for the n-th PDSCH indicated by the DCI.

If failed MBS TB decoding after receiving up to n-th PDSCH transmission, the UE attempts to receive the n+x th PDSCH transmission. (x>0). If the UE knows that the n-th PSDSCH transmission is the last transmission for the corresponding MBS TB (e.g., when the last retransmission is indicated by DCI), the UE reports a NACK through a UE-specific PUCCH resource or PUSCH. NACK transmitted through PUSCH may be included in UCI of the PSUCH or reported as MAC CE.

If MBS TB decoding is successful after receiving up to the n-th PDSCH transmission, the UE does not receive the n+x th PDSCH transmission. (x>0). In addition, the UE may report the ACK through a UE-dedicated PUCCH resource or PUSCH. The ACK in the PUSCH may be transmitted through UCI or reported as MAC CE.

In another example, if MBS TB decoding is successful after receiving up to the n-th PDSCH transmission, the UE may receive only the PDCCH for the n+x th PDSCH (x>0), and ACK can be reported through the PUCCH resource indicated by the DCI of the PDCCH. Here, the UE can skip decoding of the n+x-th PDSCH. If the UE knows that the n-th PDSCH transmission is the last transmission for the corresponding MBS TB (e.g., when the last retransmission is indicated by the corresponding DCI), the UE does not receive the n+x th PDSCH transmission.

If HARQ feedback enabling indicator=1, the UE assumes that the TPC command for scheduled PUCCH, PUCCH resource indicator, PDSCH-to-HARQ feedback timing indicator is included in the corresponding DCI, and transmits HARQ feedback for the n-th PDSCH transmission through the PUCCH resource indicated by DCI. In this case, the UE performs PUCCH transmission through the PUCCH resource based on the SS/PBCH index or CSI-RS resource indicator or TCI state Id indicated in the corresponding DCI. UCI included in PUCCH includes HARQ feedback information. HARQ feedback information is determined as ACK or NACK according to the decoding result of the n-th PDSCH transmission indicated by the corresponding DCI. If the UE knows that the nth PDSCH transmission is the last transmission for the corresponding MBS TB (e.g., when the last retransmission is indicated by the corresponding DCI), the UE may skip the PUCCH transmission. Alternatively, when the n-th PDSCH transmission is the last transmission for the corresponding MBS TB, the base station indicates that the n-th DCI is the last transmission of the corresponding MBS TB, and configures HARQ feedback enabling indicator=0.

The base station may indicate to the UE the retransmission timer value or the remaining number of retransmissions through RRC or MAC CE or DCI. When the UE receives DCI for the n-th PDSCH transmission (n>0) or receives the PDSCH, the retransmission timer value starts. When the timer expires, the UE determines that HARQ transmission for the corresponding MBS TB is finished, and when MBS TB decoding fails, flushes the soft buffer. (Or, the UE starts or restarts the retransmission timer value whenever it receives every nth PDSCH transmission (n>0).)

After the n-th PDSCH transmission for a specific SSB index, a specific CSI-RS resource, or a specific TCI state, the base station may skip the n+1th PDSCH transmission and transmit the n+2th PDSCH. In this case, the UE receives the n+2 th PDSCH transmission when the retransmission timer is still running.

When A/N or NACK only indicates NACK only, the UE transmits PUCCH only in case of NACK, and does not transmit PUCCH in case of ACK. In case of NACK only, the base station performs sequence based PUCCH transmission for the corresponding PUCCH resource. Therefore, the PUCCH format for HARQ A/N and the PUCCH format for HARQ NACK only may be configured differently. That is, the base station may change the PUCCH format to DCI for one PUCCH resource. In this case, the UE may transmit the PUCCH transmission for the n-th PDSCH transmission and the PUCCH transmission for the n+1th PDSCH transmission using different PUCCH formats according to DCIs. For example, if the DCI of the n-th PDSCH transmission indicates HARQ A/N and the DCI of the n+1th PDSCH transmission indicates HARQ NACK only, the UE may change the PUCCH format to transmit the PUCCH.

The base station transmits beams related to different SS/PBCH indexes, CSI-RS resource indicators, and/or TCI states for different PDSCH transmissions for transmitting the same MBS TB. That is, in FIG. 8, different PDSCH transmissions such as PDSCH1, PDSCH2, and PDSCH3 are related to different SS/PBCH or CSI-RS resources or TCI states.

The UE can measure the SSB index or CSI-RS resource between the n-th PDSCH transmission and the n+1-th PDSCH transmission, and accordingly, the n-th PDSCH transmission and the n+1-th PDSCH transmission can be received in different TCI states. For example, the n th PDSCH transmission and the n+1 th PDSCH transmission may be received according to different SSB indexes. Alternatively, the n-th PDSCH transmission and the n+1 th PDSCH transmission may be received according to different CSI-RS resources. Alternatively, the n-th PDSCH transmission may be received according to an SSB index, and the n+1th PDSCH transmission may be received according to a CSI-RS resource. The n-th PDSCH transmission may be received according to the CSI-RS resource, and the n+1th PDSCH transmission may be received according to the SSB index.

Meanwhile, a plurality of n-th PDSCH transmissions for different SSB indexes, different CSI-RS resources, or different TCI states may be received and combined. For example, when measurements results for SSB indices 1 and 2 are equal to or greater than a threshold, the UE may receive both PDSCH1 and PDSCH2 of the n-th PDSCH transmission. Or UE may receive either PDSCH1 or PDSCH2. When the PDCCH for PDSCH1 or the PDCCH for PDSCH2 indicates HARQ feedback enabling indicator=1, the UE selects one PDSCH resource among the received PDSCHs, and transmits HARQ feedback using the PUCCH resource mapped to the selected PDSCH. For example, the UE transmits the PUCCH by using the SSB index for the selected PDSCH, CSI-RS resource, or TCI state. For example, the UE selects one of PDSCH1 or PDSCH2. If PDSCH2 is selected, PUCCH transmission is performed according to the PUCCH resource mapped to PDSCH2 and SSB index 2 associated with PDSCH2. The UE preferentially selects the PDSCH for the SSB index/CSI-RS resource/TCI state with higher measurement quality among the SSB index, CSI-RS resource, or TCI states for PDSCH1 and PDSCH2. PUCCH transmits HARQ feedback according to the MBS TB decoding result of PDSCH1 or PDSCH2. If one of the decoding results is ACK, ACK is transmitted, and otherwise, NACK is transmitted. Alternatively, when PDSCH1 and PDSCH2 are received at the same time, they are combined with the same soft buffer for decoding, and HARQ feedback is transmitted according to the decoding result of the combined PDSCHs. Alternatively, the UE may combine and decode both PDSCH1 and PDSCH2 into the same soft buffer, and according to the decoding result, HARQ A/N information may be repeatedly transmitted through a PUCCH resource for PDSCH1 and a PUCCH resource for PDSCH2.

If DCIs for different PDSCHs (e.g., PDSCH1 and PDSCH2) of the n-th PDSCH transmission are set to HARQ feedback enabling indicator=1 and HARQ feedback enabling indicator=0, respectively, the UE prioritizes HARQ feedback enabling indicator=1 and transmit HARQ feedback. Alternatively, the DCI of the PDSCH for the SSB index/CSI-RS resource/TCI state having the best measurement quality among the associated SSB index or CSI-RS resource or TCI states may be preferentially selected/considered to determine whether to perform HARQ feedback operation.

The PUCCH resource of the n-th PDSCH transmission and the PUCCH resource of the n+1th PDSCH transmission may be allocated to different UL BWPs. For example, if the n-th PUCCH resource is in BWP1 and the n+1th PUCCH resource is in BWP2, the UE performs PUCCH transmission by switching to BWP2 after receiving the n+1th PDSCH transmission. If the UE cannot switch to BWP2 due to other high-priority transmission/reception, if there is a PUCCH resource for the SSB index/CSI-RS resource/TCI state exceeding the threshold in BWP1, HARQ A/N is transmitted using the PUCCH resource of BWP1. If there is no PUCCH resource for the SSB index/CSI-RS resource/TCI state above the threshold, the PUCCH transmission is skipped.

If CRC of the DCI for the n-th PDSCH transmission is scrambled with C-RNTI, and the corresponding DCI indicates a PUCCH resource, the corresponding PUCCH resource may be a UE-dedicated resource. DCI may indicate whether the PUCCH resource is a UE-dedicated resource or a UE common resource. When the corresponding PUCCH resource is a UE-dedicated resource, if the UE is in the connected mode, the UE transmits the PUCCH in the current active TCI state. The PUCCH transmission includes HARQ A/N for the n-th PDSCH transmission.

If CRC of the DCI for the n-th PDSCH transmission is scrambled with G-RNTI and the DCI indicates the UE common PUCCH resource, the corresponding PUCCH transmission has a lower priority than other UE-dedicated PUCCH transmissions and is not multiplexed. Therefore, when the UE common PUCCH transmission for MBS overlaps with another UE-dedicated PUCCH transmission, the UE drops the UE common PUCCH transmission and transmits the UE-dedicated PUCCH transmission.

In an embodiment of the present invention, a plurality of MBS PDSCH transmissions may be performed through multiple RS beam resources, and the UE can effectively receive the plurality of MBS PDSCH transmissions. Thus reliable MBS transmission can be provided even in a situation in which the optimal beam is changed.

Figure 9:
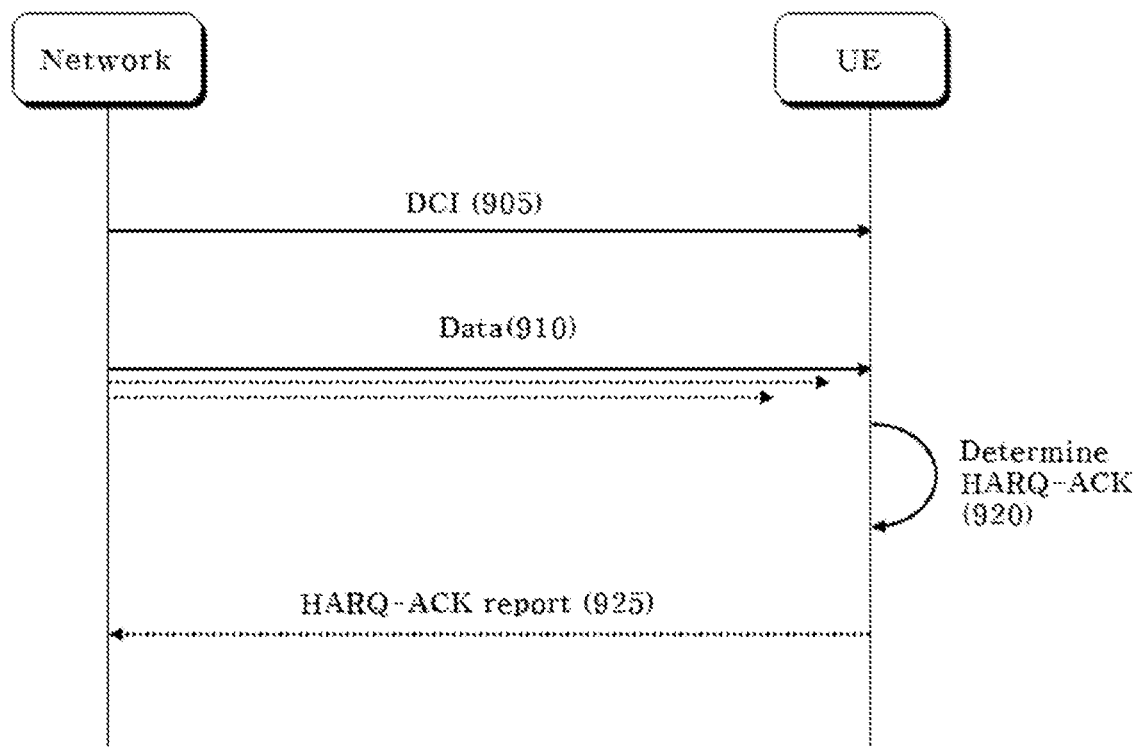
FIG. 9 illustrates a method of receiving a signal by a user equipment in an embodiment of the present invention.

FIG. 9 illustrates a method of receiving a signal by a user equipment in an embodiment of the present invention.

Referring to FIG. 9, UE may receive a physical downlink control channel (PDCCH) carrying DCI (905).

UE may perform data reception based on the DCI (910).

UE may determine (920) hybrid automatic repeat request (HARQ)-acknowledgement (ACK) based on a result of the data reception.

The HARQ-ACK may be reported (925) through a physical uplink control channel (PUCCH) based on either a first reporting type in which the HARQ-ACK reporting is performed for negative-ACK (NACK) only, or a second reporting type in which the HARQ-ACK reporting is performed for ACK/NACK both. The UE may select one of the first reporting type and the second reporting type based on the DCI. The UE may select a resource of the PUCCH based on the DCI.

The DCI may include information indicating one of the first reporting type and the second reporting type and information indicating the resource of the PUCCH.

For the first reporting type, the HARQ-ACK reporting on the PUCCH can be skipped for ACK.

The UE may determine, based on the DCI, whether to enable or disable a HARQ process for the data reception.

The DCI may include information indicating whether to enable or disable the HARQ process.

Based on a field of the DCI being a specific value, the UE may determine to disable the HARQ process.

The UE may flush a reception buffer upon an expiry of a retransmission-related timer.

The UE may determine not to perform the HARQ-ACK reporting based on a number of retransmissions performed for the data being a maximum retransmission number.

The data reception may be related to at least one of a plurality of repeated transmissions. The first reporting type and the second reporting types are used for different transmissions respectively from among the plurality of repeated transmissions.

The data reception may be related to a multicast and broadcast service (MBS).

The DCI may be common for a plurality of UEs receiving the MBS.

Figure 10:
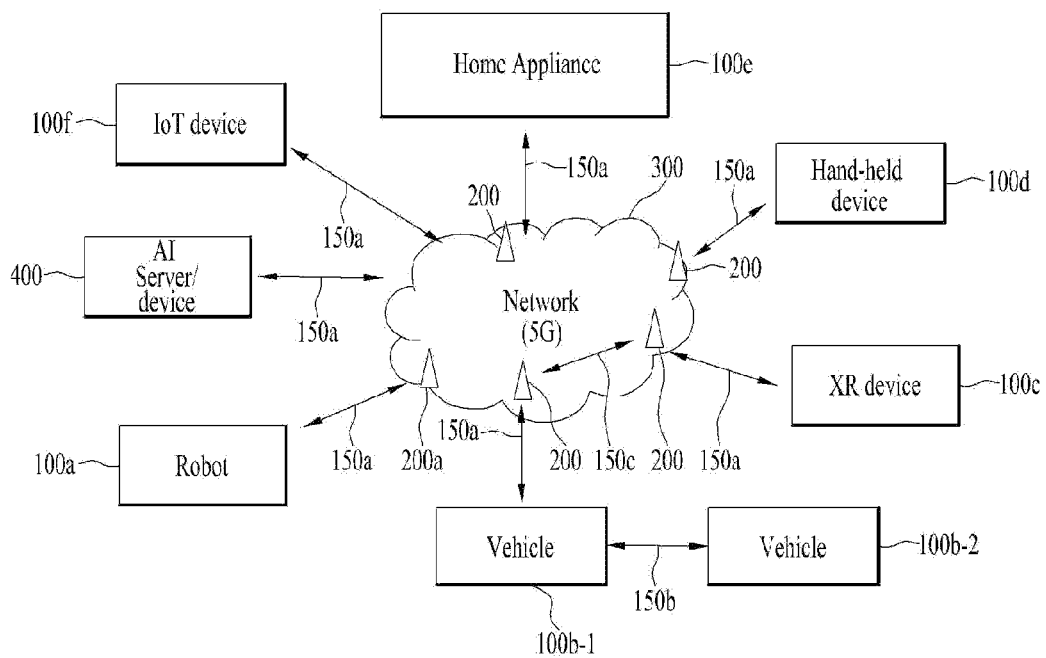
FIG. 10 to FIG. 13 illustrate a communication system 1 and wireless devices applied to the present disclosure.

FIG. 10 illustrates a communication system 1 applied to the present disclosure.

Referring to FIG. 10, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 11:
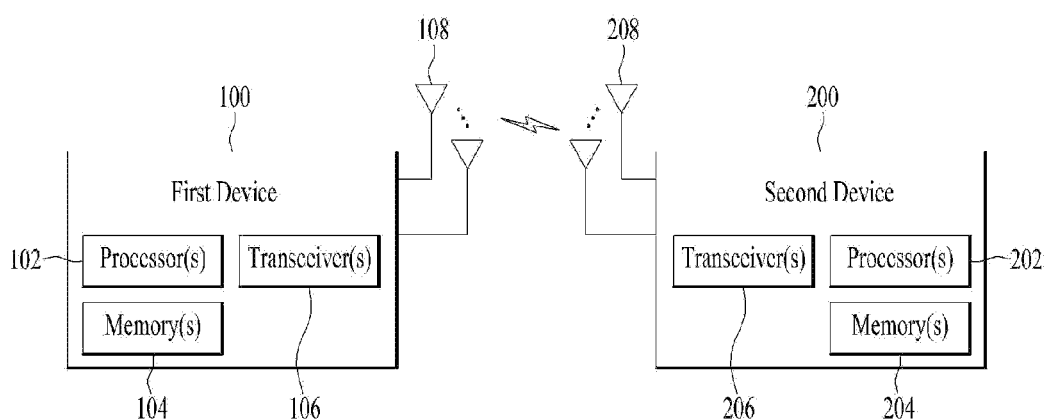

FIG. 11 illustrates wireless devices applicable to the present disclosure.

Referring to FIG. 11, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 10.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 12:
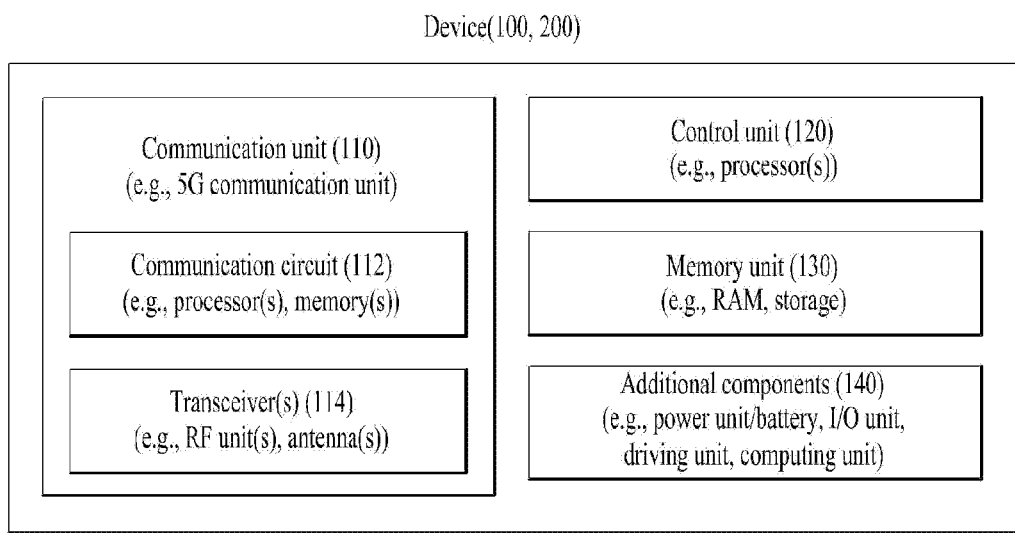

FIG. 12 illustrates another example of a wireless device applied to the present disclosure. The wireless device may be implemented in various forms according to a use-case/service (refer to FIG. 12).

Referring to FIG. 12, wireless devices 100 and 200 may correspond to the wireless devices 100 and 200 of FIG. 11 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 10), the vehicles (100*b*-1 and 100*b*-2 of FIG. 10), the XR device (100*c* of FIG. 10), the hand-held device (100*d* of FIG. 10), the home appliance (100*e* of FIG. 10), the IoT device (100*f* of FIG. 10), a digital broadcast terminal, a hologram device, a public safety device, an MTC device, a medicine device, a fintech device (or a finance device), a security device, a climate/environment device, the AI server/device (400 of FIG. 10), the BSs (200 of FIG. 10), a network node, etc. The wireless device may be used in a mobile or fixed place according to a use-example/service.

In FIG. 12, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 13:
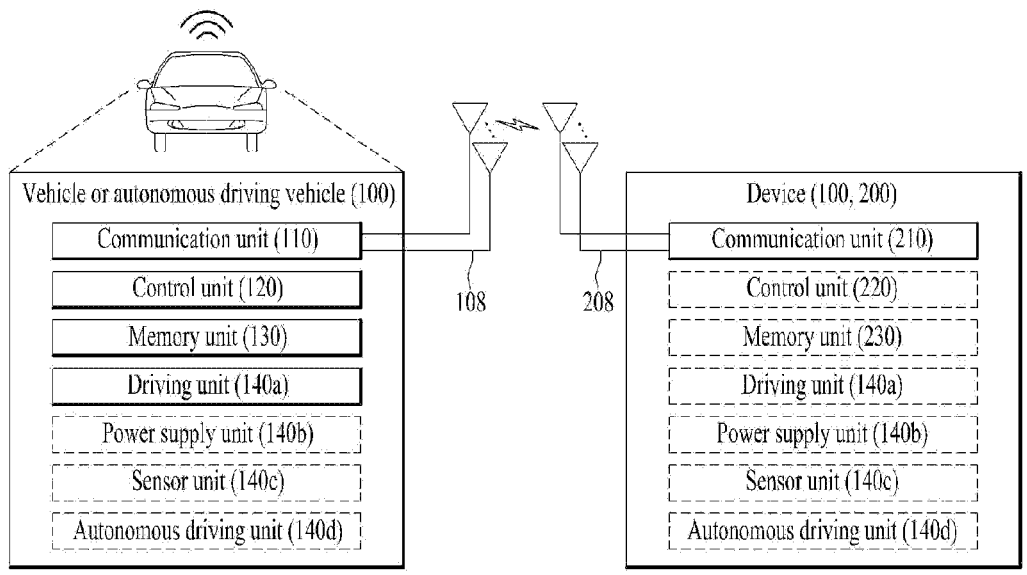

FIG. 13 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 13, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 12, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 14:
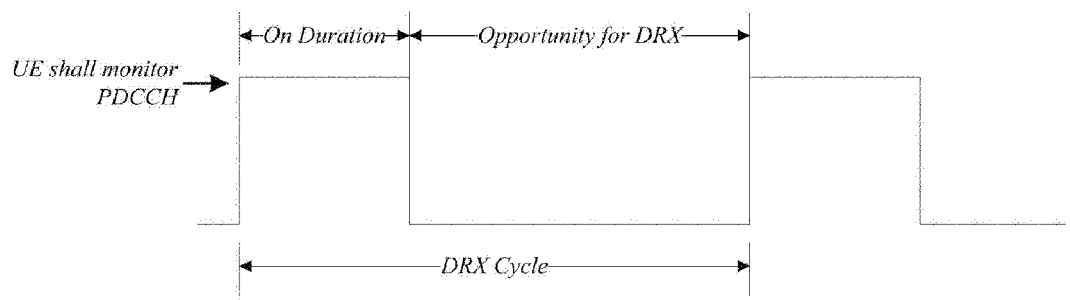
FIG. 14 illustrates an exemplary discontinuous reception (DRX) operation applied to the present disclosure.

FIG. 14 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 14, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 8 describes a DRX operation of a UE (in the RRC_CONNECTED state). Referring to Table 8, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods, as illustrated in FIG. 5.

TABLE 8

| | Type of signals | UE procedure |
|---|---|---|
| $1^{st}$ step | RRC signalling(MAC-CellGroupConfig) | Receive DRX configuration information |
| $2^{nd}$ Step | MAC CE((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

What is claimed is:

1. A method of receiving a signal by a user equipment (UE) in a wireless communication system, the method comprising:
   receiving a physical downlink control channel (PDCCH) carrying downlink control information (DCI);
   performing data reception based on the DCI; and
   determining hybrid automatic repeat request (HARQ)-acknowledgement (ACK) based on a result of the data reception,
   wherein the HARQ-ACK is reported through a physical uplink control channel (PUCCH) based on either:
   a first reporting type in which the HARQ-ACK reporting is performed for negative-ACK (NACK) only, or
   a second reporting type in which the HARQ-ACK reporting is performed for ACK/NACK both, and
   wherein the UE selects one of the first reporting type and the second reporting type based on the DCI, and selects a resource of the PUCCH based on the DCI.

2. The method according to claim 1, wherein the DCI includes information indicating one of the first reporting type and the second reporting type and information indicating the resource of the PUCCH.

3. The method according to claim 1, wherein, for the first reporting type, the HARQ-ACK reporting on the PUCCH is skipped for ACK.

4. The method according to claim 1, wherein the UE determines, based on the DCI, whether to enable or disable a HARQ process for the data reception.

5. The method according to claim 4, wherein the DCI includes information indicating whether to enable or disable the HARQ process.

6. The method according to claim 4, wherein based on a field of the DCI being a specific value, the UE determines to disable the HARQ process.

7. The method according to claim 1, wherein the UE flushes a reception buffer upon an expiry of a retransmission-related timer.

8. The method according to claim 1, wherein the UE determines not to perform the HARQ-ACK reporting based on a number of retransmissions performed for the data being a maximum retransmission number.

9. The method according to claim 1, wherein the data reception is related to at least one of a plurality of repeated transmissions, and
wherein the first reporting type and the second reporting types are used for different transmissions respectively from among the plurality of repeated transmissions.

10. The method according to claim 1, wherein the data reception is related to a multicast and broadcast service (MBS).

11. The method according to claim 1, wherein the DCI is common for a plurality of UEs receiving the MBS.

12. A non-transitory computer readable medium recorded thereon program codes for performing the method according to claim 1.

13. A device for wireless communication, the device comprising:
a memory configured to store instructions; and
a processor configured to perform operations by executing the instructions, the operations comprising:
receiving a physical downlink control channel (PDCCH) carrying downlink control information (DCI);
performing data reception based on the DCI; and
determining hybrid automatic repeat request (HARQ)-acknowledgement (ACK) based on a result of the data reception,
wherein the HARQ-ACK is reported through a physical uplink control channel (PUCCH) based on either:
a first reporting type in which the HARQ-ACK reporting is performed for negative-ACK (NACK) only, or
a second reporting type in which the HARQ-ACK reporting is performed for ACK/NACK both, and
wherein the processor selects one of the first reporting type and the second reporting type based on the DCI, and selects a resource of the PUCCH based on the DCI.

14. The device according to claim 13, further comprising;
a transceiver configured to transmit or receive a signal under control of the processor.

15. The device according to claim 14, wherein the device is a user equipment (UE) configured to perform 3rd generation partnership project (3GPP)-based wireless communication.

* * * * *